Dec. 31, 1957 C. T. CABLER 2,818,266
UTILITY VEHICLE FOR FACILITATING GARDEN WORK
Filed Jan. 27, 1954 2 Sheets-Sheet 1
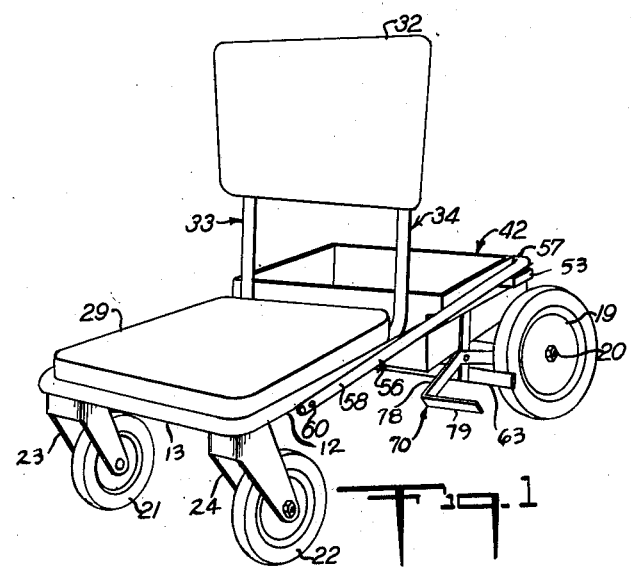
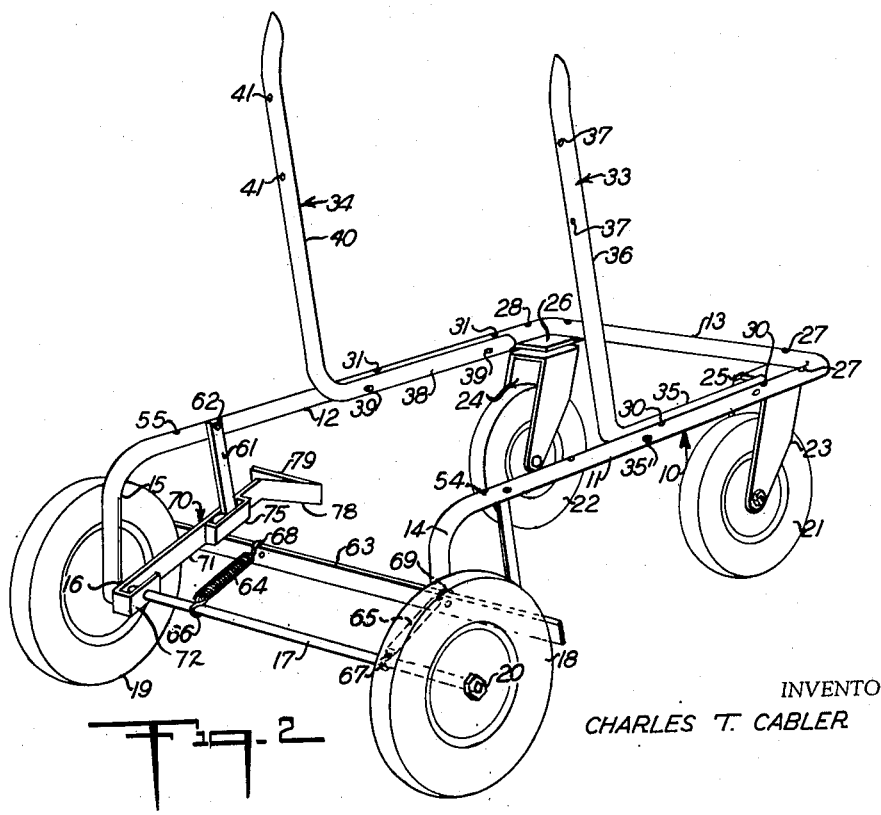
INVENTOR
CHARLES T. CABLER
BY
Donald G. Eaton
AGENT Dec. 31, 1957     C. T. CABLER     2,818,266
UTILITY VEHICLE FOR FACILITATING GARDEN WORK
Filed Jan. 27, 1954     2 Sheets-Sheet 2
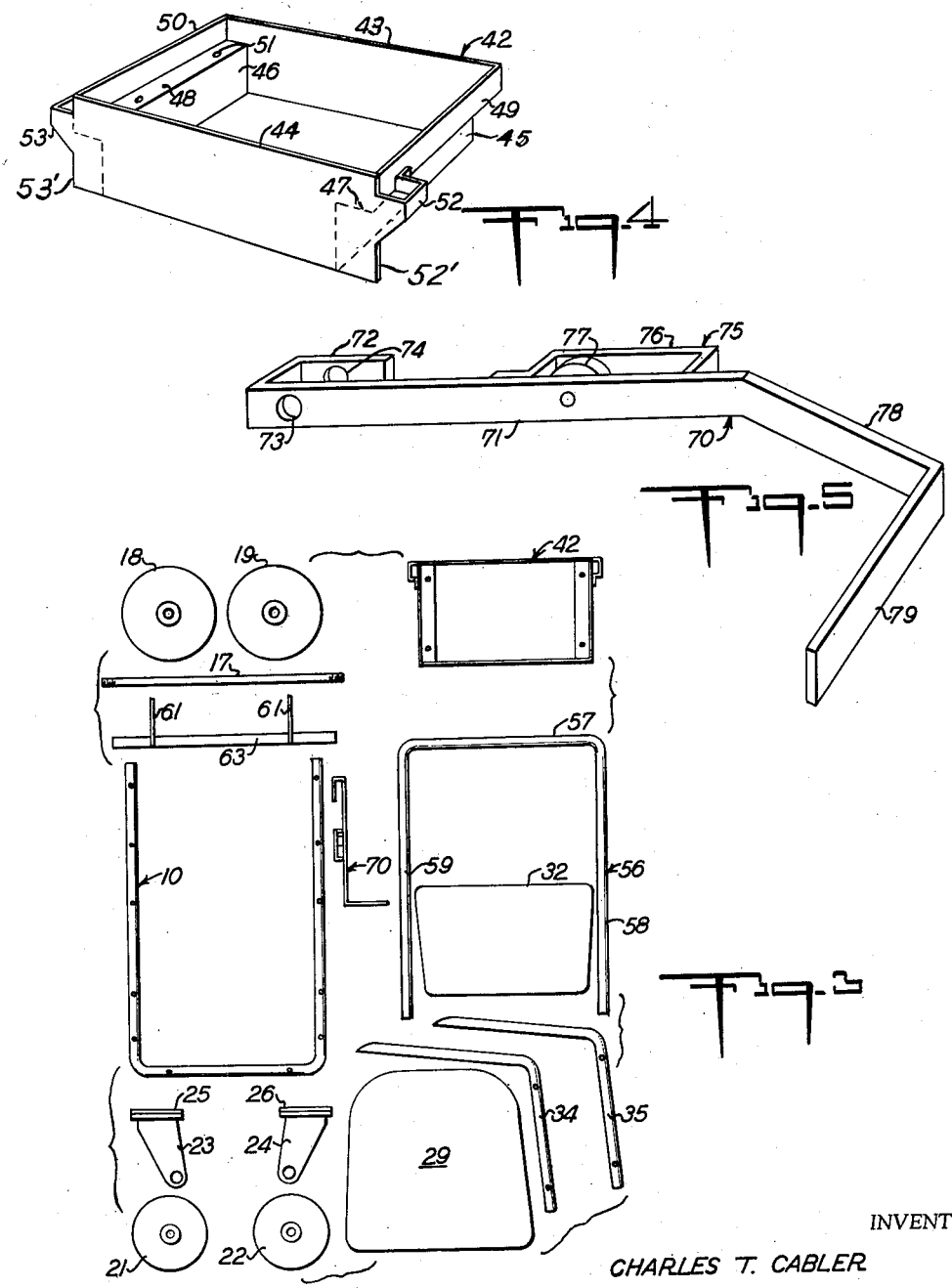
INVENTOR
CHARLES T. CABLER
BY Donald G. Eaton
AGENT

United States Patent Office 2,818,266
Patented Dec. 31, 1957

2,818,266

UTILITY VEHICLE FOR FACILITATING GARDEN WORK

Charles T. Cabler, Richmond, Va.

Application January 27, 1954, Serial No. 406,385

1 Claim. (Cl. 280—32.5)

This invention relates to transportation and more particularly to a utility vehicle specifically designed for facilitating garden work and the like, while the person performing the same is seated in a comfortable and convenient position and represents an improvement on the vehicle described and claimed in my co-pending application Ser. No. 367,235, filed July 10, 1953. The vehicle of this invention is also designed for general utility work such as transporting groceries and other articles and while in no sense a toy may be utilized by children for riding and similar uses.

As is well known, much garden work is transplanting weeding and similar operations requiring that the persons hands be in close proximity to the ground, this is extremely tiring as a result of the unnatural and awkward position required, which situation often reduces such work to a drudgery when in reality if the person could be more comfortable and work for appreciable periods of time without becoming unduly fatigued, such work could well be a relaxing pastime.

Heretofore, there have been numerous vehicles which might be utilized for applicant's purpose, but these have largely been children's toy vehicles which were not specifically designed for the purpose and which were usually of such weak construction that use by an adult for any appreciable period of time, would result in sufficient damage to the vehicle to render the same substantially useless. Furthermore, these prior art devices were not provided with space for holding plants to be transplanted, garden tools of the hand variety or other implements or materials which might be required. Likewise, no means was provided for preventing inadvertant movement of the vehicle which sometimes resulted in damage to plants and the like, since such inadvertent movement could not be controlled by the occupant who would be completely unaware that such movement was about to take place.

It is accordingly an object of the invention to provide a vehicle for facilitating garden work by a person seated thereon, which vehicle is of lightweight, economical construction and which will provide a convenient comfortable seat for a person and permit movement at will, merely by pushing with the feet.

A further object of the invention is the provision of a vehicle for facilitating garden work by a person seated thereon, which vehicle is provided with parking brake means which may be applied or released at will, and when applied serves to securely hold the vehicle in a selected position.

A still further object of the invention is the provision of a vehicle for facilitating garden work by a person seated thereon, which vehicle is provided with a body for carrying tools, plants or other desired implements or materials.

Another object of the invention is the provision of a vehicle for facilitating garden work by a person seated thereon, which vehicle is provided with a handle bar for facilitating movement thereof from place to place, and which handle bar is movable to an inoperative, out of the way position when a person is seated on the vehicle.

A further object of the invention is the provision of a vehicle for facilitating garden work by a person seated thereon, and in which the running gear is of such design that the vehicle will track properly when towed and will not tend to weave from side to side.

A still further object of the invention is the provision of a vehicle for facilitating garden work by a person seated thereon, which vehicle is so constructed as to facilitate this assembly thereof, for transportation and storage and in which all of the parts may be fabricated from lightweight readily available materials, thus resulting in a lightweight vehicle of comparatively low cost.

Further objects and advantages of the invention will be apparent from the following description taken in conjunction with the accompanying drawing wherein:

Fig. 1 is a front perspective view showing a vehicle constructed in accordance with this invention;

Fig. 2, a rear perspective view showing the frame and chassis of the vehicle shown in Fig. 1;

Fig. 3, a top plan view of all of the parts which go to make up the vehicle of this invention and showing the manner in which the same may be disassembled for storage or shipment;

Fig. 4, a perspective view of the body utilized with the vehicle of this invention; and Fig. 5, a view in perspective of the brake operating lever.

With continued reference to the drawing there is shown a vehicle constructed in accordance with this invention and including a chassis 10 formed from a single piece of tubular metallic stock, this chassis 10 having side bars 11 and 12, a front cross bar 13 and downturned rear ends 14 and 15. The downturned rear ends 14 and 15 are provided with apertures 16 adjacent the lower ends thereof and received through these apertures is a rear axle 17. Axle 17 serves to rotatably receive ground engaging wheels 18 and 19 and these wheels are held in place on the axle 17 by nuts 20 which threadedly engage the axle 17, adjacent each end thereof.

The vehicle is supported at its forward end by ground engaging caster wheels 21 and 22 which are rotatably mounted in brackets 23 and 24, these brackets in turn being mounted for swivel movement on mounting plates 25 and 26. Bracket 23 carrying wheel 21 is secured to the chassis 10 adjacent the juncture of the side bar 11 and the front cross bar 13 by suitable fastening means extending through apertures 27 in the chassis 10 and into or through the mounting plate 25 and bracket 24 carrying ground engaging wheel 22 is secured to the chassis 10 by suitable fastening means extending through apertures 28 and into or through the mounting plate 26. Obviously, the caster wheels 21 and 22 will permit turning of the vehicle in either direction and furthermore, in the event the vehicle is towed or pushed, the caster wheels 21 and 22 will trail in a proper manner to prevent weaving of the vehicle from side to side.

In order that the vehicle of this invention may be comfortably occupied by a person while working in a garden or for any other desired reason, a seat 29 is provided which may be secured to the side bars 11 and 12 by suitable fastening means extending through or into apertures 30 in the side bar 11 and apertures 31 in the side bar 12, and in order to provide further comfort for the occupant, a seat back 32 may be supported on back brackets 33 and 34, each of which may be formed of tubular metallic stock to provide sufficient rigidity while being of substantially light weight. Seat back bracket 33 may be provided with a leg portion 35 secured to the side bar 11 of the chassis 10 by suitable fastening means extending through or into apertures 35′ in the side bar 11, the leg portion 35 being mounted inwardly of the side bar 11 and below the seat 29 there being an upwardly extending bracket portion 36 extending upwardly from the leg portion 35 and having apertures 37 to receive suitable fastening means for securing the seat back 32 thereto.

Seat back support 34 is formed similarly to the support 33 and is provided with a leg portion 38 being disposed inwardly of the side bar 12 of chassis 10 and secured thereto by suitable fastening means extending through aperture 39 in the leg portion 38. Extending upwardly from the leg portion 38 is a seat back bracket portion 40 which may be provided with apertures 41 for receiving suitable fastening means for attaching the seat back 32 thereto.

As best shown in Figs. 1, 3 and 4, a load carrying body 42 is provided which may well comprise front and rear end walls 43 and 44 and side walls 45 and 46 which terminate in overhanging ledges 47 and 48 there being flanges 49 and 50 extending upwardly from the ledges 47 and 48 adjacent the side edges thereof.

Ledges 47 and 48 are provided with apertures 51 the purpose of which will be presently described and rear wall 44 is provided at each end thereof with an outwardly extending portion forming a lip 52 and 53, the purpose and use of which will presently appear. Rear wall 44 is also provided with portions 52' and 53' extending outwardly beyond the side walls 45 and 46 to present a more finished and pleasing appearance.

As shown in Fig. 1, body 42 is positioned on the vehicle rearwardly of the seat back 32 and with the side walls 45 and 46 disposed between the side rails 11 and 12 of the chassis 10. In this position the ledges 47 and 48 rest upon the upper surface of side rails 11 and 12 and the body 42 may be secured in place on the chassis 10 by suitable fastening means extending through the apertures 51 in the ledges 47 and 48 and into apertures 54 and 55 respectfully in the side bars 11 and 12.

Body 42 may serve to carry plants to be transplanted, seeds, implements of any desired kind, and, in fact, any objects or material which the person utilizing the vehicle may desire to have at hand for convenient use.

In order to conveniently move the vehicle of this invention from place when the same is not being utilized by a person seated thereon, a handle bar 56 may be provided which may be of U-shaped tubular construction, having a cross bar 57 and substantially parallel side bars 58 and 59 which are pivotally secured at 60 to the side bars 11 and 12 of the chassis 10. In Fig. 1, the handle bar 56 is shown in inoperative position where it rests at a slight upward inclination on the ears 52 and 53 extending outwardly from each side of the body 42, and when it is desired to use the handle bar 56 for pulling the vehicle, the same is pivoted about the pivotal mounting 60 to a position forwardly of the vehicle where it may be conveniently grasped to pull the same.

When using the vehicle of this invention it is highly desirable that the same remain in a selected location until work at that location is completed and since the vehicle may easily be moved by pressure of the feet of the person occupying the same upon the ground, or by reason of the fact that the vehicle is situated on an incline, means to maintain the vehicle in such position is provided in the form of a parking brake which may well comprise a pair of arms 61 pivotally mounted on pivots 62 on the side bars 11 and 12 of the chassis 10, the arm 61 depending below such chassis. Secured to the lower ends of arms 61 and extending transversely of the chassis 10 is a brake beam 63, a portion of which at each end is adapted to engage the treads of wheels 18 and 19. In order to bias the brake beam 63 into firm engagement with the wheels 18 and 19 to lock the same against rotation, tension springs 64 and 65 may be secured at one end 66 and 67 respectfully to the axle 17 and at their opposite ends 68 and 69 respectfully to the brake beam 63. Obviously if desired, only one spring be employed but since the two spaced springs as shown, provide a more balanced operation such structure is considered preferable.

In order to release the parking brake by moving the brake beam 63 away from the wheels 18 and 19 against the action of the tension springs 64 and 65, an actuating lever 70 is provided which is best shown in Fig. 5, may comprise an elongated relatively straight bar 71 terminating at one end in a reversely bent portion to provide a spaced ear 72. Bar 71 and ear 72 are provided with aligned apertures 73 and 74 which as shown in Fig. 2 are adapted to be received over the axle 17 inwardly of the downwardly extending portion 15 of the side bar 12 of the chassis 10 to rotatably mount the brake actuating lever 70 on the axle 17. The spaced apertures 73 and 74 provide a suitable bearing for the bar 70 and prevent tilting of the same relative to the axle thereby precluding binding and materially facilitating the ease of operation thereof.

Secured to one side of the bar 71 is a strap 75 having a portion 76 spaced from the bar 71 to provide an elongated opening and within this opening there is rotatably mounted a roller 77, the purpose of which will presently appear. The actuating lever 70 may be bent downwardly for a portion of its length 78 and this portion may terminate in an outwardly extending angularly disposed hand engaging portion 79 which as shown in Figs. 1 and 2 projects outwardly of the side of the chassis 10 of the vehicle in a convenient location to be grasped by the hand of the occupant. As shown in Fig. 2, one of the downwardly extending arms 61 passes through the opening provided by the strap 75 and the arm 61 is engaged on the rear side thereof by the roller 77.

In operation when it is desired to apply the parking brake and lock the ground engaging wheels 18 and 19 against rotation, it is only necessary for the occupant to grasp the hand engaging portion 79 of the actuating lever 70 and move the same upwardly to permit rearward movement of the brake beam 63 under the action of tension spring 64 and 65 until the brake beam 63 engages the treads of wheels 18 and 19 to lock the same against rotation. When it is desired to release the parking brake the actuating lever 70 may be moved downwardly at which time the roller 77 in engagement with the rear surface of downwardly extending arm 61 will act as a cam to move the arm 61 and brake beam 63 carried thereby, forwardly away from the wheels 18 and 19 to release the same and permit movement of the vehicle in any desired direction. Since the downward movement of the actuating lever 70 is slightly below dead center, the same will retain the brake beam 63 in released position until such time as it is desired to reengage the parking brake.

It will be seen that by the above described invention there has been provided a very simple, lightweight and relatively inexpensive vehicle which may serve as a support for a person engaged in garden work or the like, which person will be in close proximity to the ground and in a position to conveniently and comfortably carry out such operations as may be desired, the vehicle being movable and steerable to any desired location merely by the occupant exerting pressure upon the ground through his or her feet. Furthermore, the running gear which is provided is such that in the event it is desired to tow or push the vehicle, the same will follow a relatively straight path in the wake of the towing vehicle without weaving from side to side as would be the case if the particular caster wheel arrangement were not provided. Also very simple, yet highly efficient braking means is provided to maintain the vehicle in any desired location and a load carrying body is included for transporting and supporting for convenient use, any desired objects or materials. The vehicle of this invention is relatively small and occupies little space when not in use and the same may be conveniently disassembled for shipment or transportation from place to place in a package of minimum dimensions.

It will be obvious to those skilled in the art that various changes may be made in the invention without departing from the spirit and scope thereof and therefore the invention is not limited by that which is shown in the drawing and described in the specification, but only as indicated in the appended claim.

What is claimed is:

A utility vehicle comprising a generally U-shaped one-piece chassis of tubular material having a front cross bar and side bars terminating in down turned rear end portions, aligned apertures in said rear end portions adjacent the lower ends thereof, an axle extending through said apertures, ground engaging rear wheels rotatably mounted on said axle, a caster wheel mounted on said chassis adjacent each front corner thereof, a seat back support having a leg portion extending parallel to and secured to each side bar inwardly thereof and having a bracket portion extending upwardly at a slight rearward inclination to provide spaced seat back supports disposed substantially midway of the length of the vehicle, a seat back secured to said seat back supports, a seat secured to said side bars and said front cross bar of said chassis, a load carrying body comprising bottom, front, rear and sidewalls disposed between said sidebars rearwardly of said seat back supports, said sidewalls having ledges adjacent the upper edges for resting on said side bars to support said body, a handle bar for pulling said vehicle comprising a U-shaped tubular member pivotally secured to said chassis forwardly of said seat back supports, said handle bar extending forwardly of said vehicle when in operative position and extending rearwardly at a slight upward inclination when in inoperative position, ears integral with said rear wall and extending from each side of said body outwardly of said ledges and said side bars and above said side bars for supporting said handle bar in inoperative position and parking brake means for engaging said rear wheels to lock the same against rotation.

References Cited in the file of this patent

UNITED STATES PATENTS

| | | |
|---|---|---|
| 238,223 | Fogg | Mar. 1, 1881 |
| 1,559,796 | Shuey | Nov. 3, 1925 |
| 1,570,410 | Strauss | Jan. 19, 1926 |
| 2,033,037 | Lang | Mar. 3, 1936 |
| 2,426,432 | Breckner et al. | Aug. 26, 1947 |
| 2,435,022 | Troendle | Jan. 27, 1948 |
| 2,544,099 | Malin | Mar. 6, 1951 |
| 2,624,395 | Johnson | Jan. 6, 1953 |
| 2,663,376 | Curley | Dec. 22, 1953 |
| 2,674,462 | Dracos et al. | Apr. 6, 1954 |

FOREIGN PATENTS

| | | |
|---|---|---|
| 424,038 | Italy | June 22, 1944 |